United States Patent [19]

Furchak et al.

[11] 4,238,137
[45] Dec. 9, 1980

[54] SLIDE BEARING

[75] Inventors: Robert A. Furchak, Pine Brook; Ronald L. Roman, Denville, both of N.J.

[73] Assignee: American Bearing Company, Inc., Fairfield, N.J.

[21] Appl. No.: 900,097

[22] Filed: Apr. 26, 1978

Related U.S. Application Data

[63] Continuation of Ser. No. 725,321, Sep. 21, 1976, abandoned.

[51] Int. Cl.³ .............................................. F16C 29/02
[52] U.S. Cl. .................................... 308/3 R; 428/256; 428/422; 308/238; 52/167; 52/573
[58] Field of Search ............... 428/422, 256, 593, 608, 428/624; 52/167, 573; 308/238, 3 R, 3 C

[56] References Cited

U.S. PATENT DOCUMENTS

| 3,397,856 | 8/1968 | Sullivan et al. | 14/16.1 |
| 3,501,360 | 3/1970 | Mancel | 428/422 |
| 3,711,166 | 1/1973 | Wayson | 308/3 R |
| 3,955,856 | 5/1976 | Wayson et al. | 308/3 R |

Primary Examiner—Richard A. Bertsch
Attorney, Agent, or Firm—Seidel, Gonda, Goldhammer & Panitch

[57] ABSTRACT

A slide bearing having a backing pad forming a substantially planar face on which a mesh is affixed. A piece of sheet bearing material is impaled on the mesh by the application of pressure and heat for permitting the bearing to support higher loads at higher temperatures than obtainable by attaching the bearing material directly to the pad as by a suitable adhesive.

10 Claims, 5 Drawing Figures

SLIDE BEARING

This is a continuation of application Ser. No. 725,321, filed Sept. 21, 1976, now abandoned.

BACKGROUND OF THE INVENTION

1. Field of the Invention

This invention relates generally to slide bearings, and particularly to slide bearing pads suitable for placement between various superstructures and their supporting bases so as to permit the superstructures to move in accordance with various forces such as thermal expansion and contraction, winds, and changes in the amount of weight being supported by the superstructures.

2. Description of the Prior Art

Various structures which employ open frameworks for carrying the load of the structure are conventionally provided with a bearing pad intended to permit sliding movement between an associated structural member of the structure and a foundation or other base supporting the structural member.

U.S. Pat. No. 3,243,236, issued Mar. 29, 1966 to J. M. Graham, discloses a low-friction bearing pad intended for use with structures as described above wherein a piece of sheet bearing material, such as polytetrafluoroethylene is bonded to a pad of elastomeric material as by an epoxy adhesive, and the like. Further, U.S. Pat. No. 3,397,856, issued Aug. 20, 1968 to D. J. Sullivan et al, discloses a structural bearing pad wherein a layer of polytetrafluoroethylene is bonded to a perforated metal plate itself embedded in a pad constructed from an elastomeric material such as neoprene. The latter mentioned reference stipulates that the film or sheet of the bearing material must first be etched in a known manner before a layer of a suitable adhesive, such as a heat-activatable epoxy resin, is applied to the bearing material in order to adhere same to the perforated metal plate. The reason for this etching of the sheet of bearing material prior to adherence thereof to the backing plate or pad is that nonpolar polymeric substrates such as polytetrafluoroethylene are very difficult to adhesively bond, and they must be chemically treated to introduce polar sites on the surface of the material. Not only is this necessary chemical treatment expensive and time consuming, but the resulting bond is still the weakest link in the resulting slide bearing and limits the maximum loads and temperatures which such bearings can withstand.

Various proposals have been made for facilitating attachment of adhering polymeric bearing materials, such as tetrafluoroethylene, to metal backing members. Examples of the use of perforated backing members to facilitate adherence can be found in U.S. Pat. Nos. 2,622,949, issued Dec. 23, 1952 to Louis M. Cotchett; 2,976,093, issued Mar. 21, 1961 to V. G. Reiling. In addition, U.S. Pat. No. 2,051,373, issued Aug. 18, 1936 to P. J. Fitzgerald, discloses the use of upstanding tabs on sheet metal or the like in order to facilitate binding to the sheet metal fibers or yielding materials such as used to construct brake linings, gaskets, and the like.

SUMMARY OF THE INVENTION

It is an object of the present invention to provide a slide bearing capable of supporting higher loads at higher temperatures than known slide bearings are capable of supporting in like applications.

It is another object of the present invention to provide a slide bearing construction which eliminates the need to use an adhesive to attach a piece of sheet bearing material to an associated backing pad.

These and other objects are achieved according to the present invention by providing a slide bearing having: a backing pad including a substantially planar face; a mesh disposed covering the face of the backing pad; and a bearing material mechanically locked or impaled on the mesh so as to be captured thereby and bonded to the backing pad without the use of an adhesive.

The mesh is advantageously constructed from a metal expanded in a known manner so as to form a waffle-like grid and affixed to the backing pad, itself preferably constructed from a suitable metal as a solid rectangular parallelepiped, by a conventional technique such as welding. The bearing material is a piece of sheet material pressed into the mesh under suitable pressure and temperature so as to be captured by the mesh.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
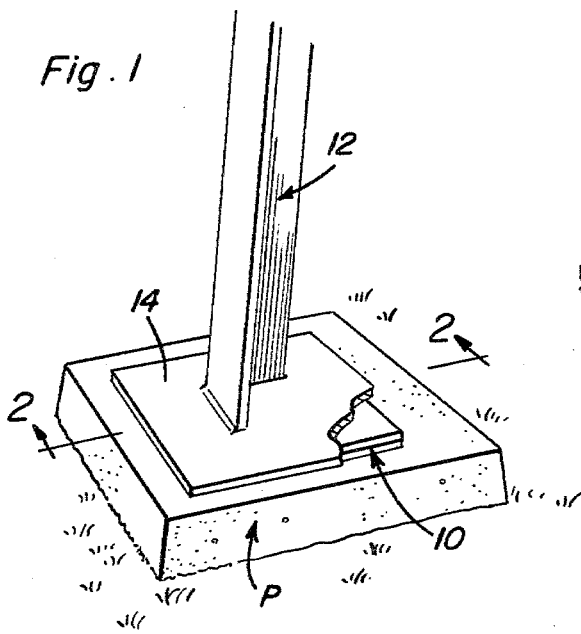
FIG. 1 is a fragmentary, perspective view showing a possible application of a bearing pad according to the present invention.

Referring now particularly to FIG. 1 of the drawings, a slide bearing 10 according to the present invention is illustrated in a typical application wherein a structural member 12, which can be part of an antenna tower and the like, is fastened to a plate 14 as by welding for sliding movement with respect to bearing 10. Bearing 10 itself rests on a masonry foundation P, and the like, so as to slidably contact the larger plate 14. It will be appreciated that a slide bearing 10 according to the invention can be used in other typical slide bearing applications, including those using an elastomeric material between the structural member and the bearing.

Figure 2:
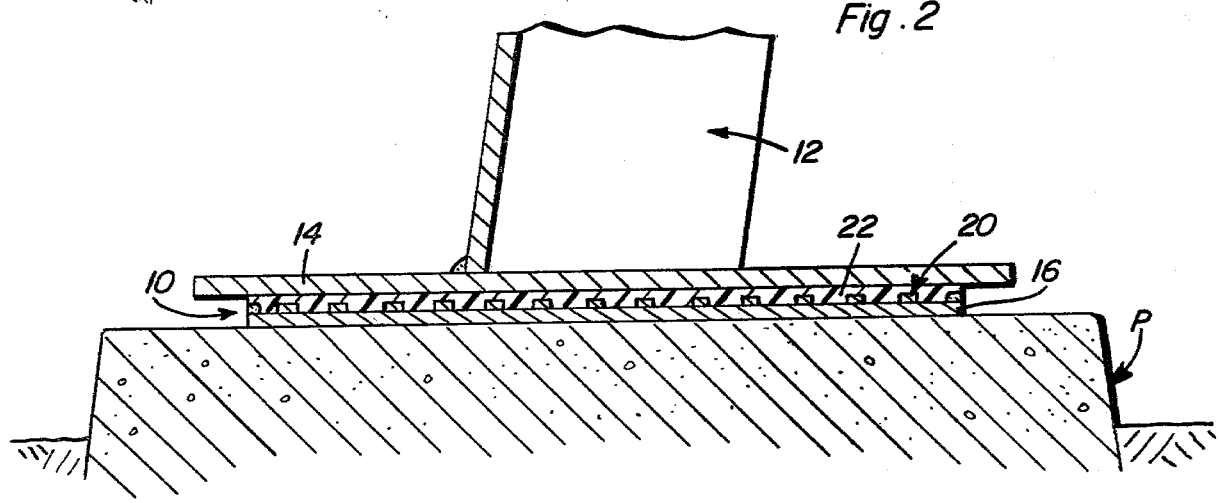
FIG. 2 is a fragmentary, enlarged, sectional view taken generally along the line 2—2 of FIG. 1.
Figure 3:
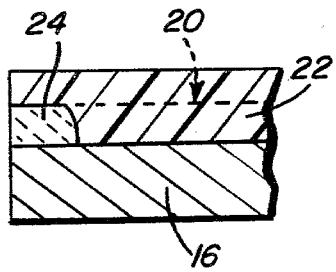
FIG. 3 is a fragmentary, enlarged, sectional view showing in detail the left corner portion of the slide bearing according to the present invention as seen in FIG. 2.

As is shown in FIGS. 2 and 3 of the drawing, slide bearing 10 includes a backing pad 16 having a substantially planar face 18 on which is affixed, as by peripheral welds, a mesh 20 disposed covering face 18. Mesh 20 is advantageously constructed in a conventional manner by expanding a suitable metal, such as a steel or even aluminum, to form a waffle-like grid. A bearing material 22, such as a piece of sheet polytetrafluoroethylene, is impaled on mesh 20 so as to be captured by same without the use of an adhesive and the like.

Pad 16 is advantageously a solid rectangular parallelepiped with the face 18 being one planar side thereof. Suitable materials for constructing pad 16 include steel, either carbon or stainless, or a corrosion resistant steel, and aluminum.

As can best be seen from FIG. 3, pad 16 and mesh 20 are provided with a, for example, continuous weld 24 about the peripheral portions thereof for retaining mesh 20 on face 18 of pad 16.

Figure 4:
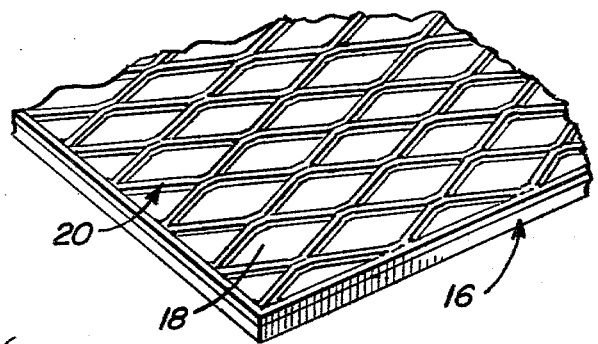
FIG. 4 is a fragmentary, perspective view showing one stage in the construction of a slide bearing according to the present invention.
Figure 5:
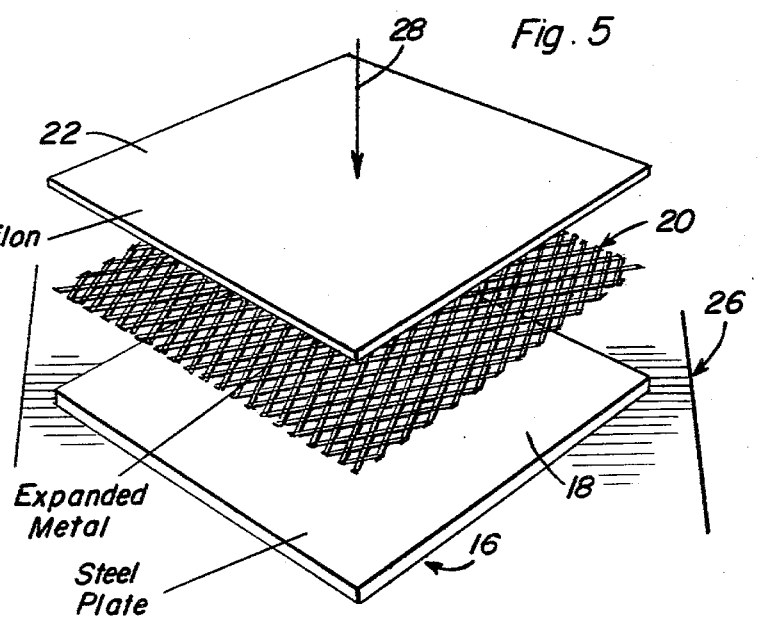
FIG. 5 is an exploded, schematic, perspective view showing the three elements making up a slide bearing according to the present invention disposed in a press for impaling the bearing material onto an expanded metal mesh.

FIGS. 4 and 5 help demonstrate the manner of fabricating a slide bearing according to the present invention. Initially, a piece of metal sheet is expanded into a mesh 20 and is subsequently secured to a face 18 of an associated backing pad 16 as described above. This stage of fabricating a slide bearing according to the invention is seen in FIG. 4. Next, the backing pad 16 with the mesh 20 affixed thereto is placed into a press 26, which is of conventional construction, together with a piece of sheet bearing material 22. Mesh 20 is shown as unattached to pad 16 in FIG. 5 for the sake of illustration, although it is to be understood that it is usually preferable to attach mesh 22 to pad 16 prior to placement of these elements into press 26. A pressure represented by the arrow 28 of FIG. 5 is exerted on the three elements perpendicularly to the planes thereof in order to impale the bearing material 22 onto the mesh 20. In order to effect capture of bearing material 22 by mesh 20, the elements are subjected to pressure and heat for a predetermined time within the press 26. For example, a pressure of 3000 psi at a temperature of 500 degrees F. maintained for approximately 5 minutes has been found satisfactory to effect the capture. Once the time, say 5 minutes, has expired, the pressure and heat can be removed from the now integral bearing within press 26, the press opened, and the finished bearing removed.

The piece of bearing material 22 is advantageously cut to size from a sheet of suitable low friction material, such as polytetrafluoroethylene as commercially available, prior to insertion of the bearing material into press 26. While it is to be understood that the various dimensions of the elements used in constructing a bearing according to the present invention can vary, a small bearing having a pad of which the face is approximately 2"×2" has been found satisfactory when a mesh is employed which has approximately 4×1½ diamond-shaped grid designs, as shown in FIG. 4, provided on it. The thickness of the mounting or backing pad 16 may vary from, for example, 16 guage to ⅜ inch for steel and, say ½ inch for aluminum. Slide bearings constructed according to the present invention have been found satisfactory for handling loads from 75 psi to 6000 psi at temperatures ranging from minus 50 degrees F. to 450 degrees F.

As can be readily understood from the above description and from the drawings, a slide bearing according to the present invention permits improved performance in applications typical of such bearings, while permitting of a simple and inexpensive manner of fabrication.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A slide bearing comprising a rigid backing pad having a face, a metal mesh covering the face of the pad, means fixedly securing the mesh to the pad, and a sheet of low friction bearing material overlying the mesh and having a portion of its thickness pressed into the mesh to interlock the bearing material with the mesh.

2. A slide bearing according to claim 1 wherein the sheet of low friction bearing material is a sheet of non-polar polymeric material.

3. A slide bearing according to claim 2 wherein the non-polar polymeric material is polytetrafluoroethylene.

4. A slide bearing according to claim 1 wherein the sheet of low friction bearing material is attached to the mesh without adhesive for structural integrity.

5. A slide bearing according to claim 1 wherein the rigid backing pad is made of metal and the mesh is welded to the backing pad.

6. A slide bearing according to claim 5 wherein the mesh is welded to the backing pad along peripheral portions of the mesh and the backing pad.

7. A slide bearing according to claim 1 wherein the backing pad is made of a metal selected from the group consisting of carbon steel, stainless steel, corrosion resistant steel and aluminium.

8. A slide bearing according to claim 1 wherein the mesh is made of expanded metal.

9. A slide bearing according to claim 8 wherein the mesh is made of a metal selected from the group consisting of steel and aluminium.

10. A slide bearing according to claim 1 wherein the backing pad is a solid rectangular parallelepiped and the face of the backing pad is a planar side of the parallelepiped.

* * * * *